R. V. HEUSER.
CHEMICAL APPARATUS.
APPLICATION FILED AUG. 8, 1918.

1,395,641.

Patented Nov. 1, 1921.
4 SHEETS—SHEET 1.

INVENTOR
Ralph V. Heuser

BY Richard B. Owen.

ATTORNEY

R. V. HEUSER.
CHEMICAL APPARATUS.
APPLICATION FILED AUG. 8, 1918.

1,395,641.

Patented Nov. 1, 1921.
4 SHEETS—SHEET 3.

WITNESSES

INVENTOR
Ralph V. Heuser
BY
ATTORNEY

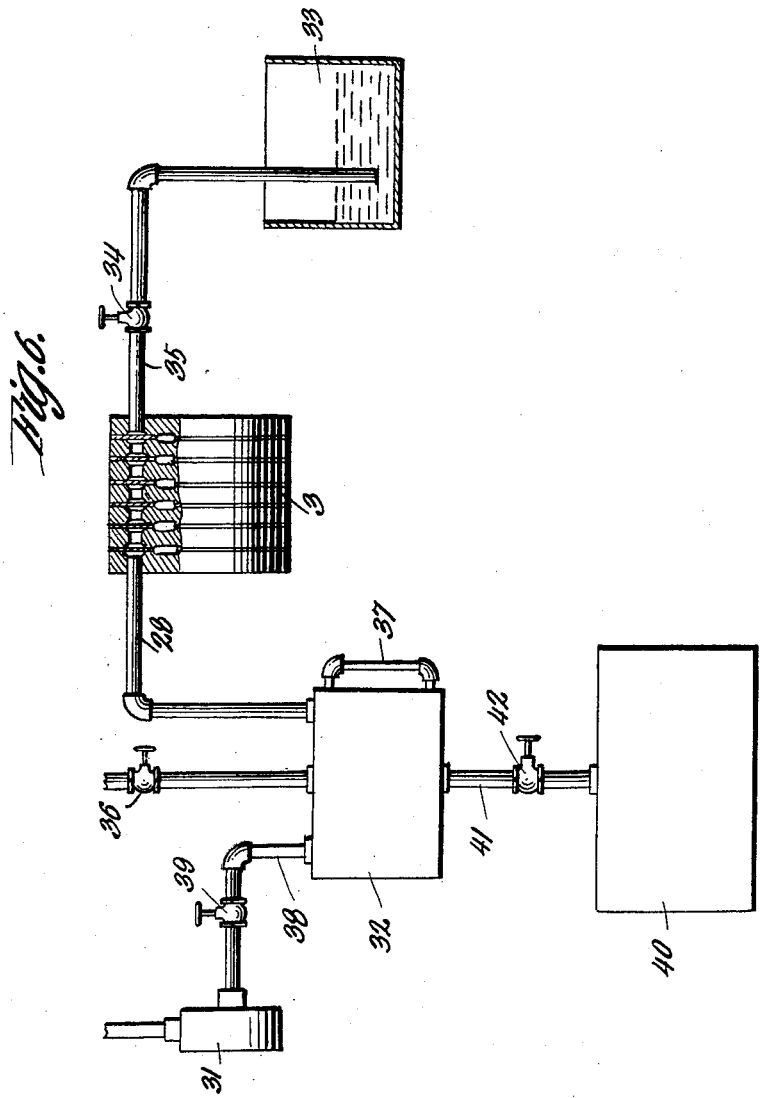

UNITED STATES PATENT OFFICE.

RALPH V. HEUSER, OF YONKERS, NEW YORK.

CHEMICAL APPARATUS.

1,395,641. Specification of Letters Patent. Patented Nov. 1, 1921.

Application filed August 8, 1918. Serial No. 248,953.

*To all whom it may concern:*

Be it known that I, RALPH V. HEUSER, a citizen of Switzerland, residing at Yonkers, in the county of Westchester and State of New York, have invented certain new and useful Improvements in Chemical Apparatus, of which the following is a specification.

This invention relates to chemical apparatus, and more particularly to what may be termed filter rolls.

The main object of the invention is to provide an apparatus for separating continuously oily or other liquid impurities from crystalline reaction products. As an instance for the applicability of the apparatus there may be mentioned the purification of certain nitroderivatives or other intermediates which cannot be obtained in a pure state in a single operation but which are nearly always contaminated by one or more isomeres giving rise to eutectic mixtures. The apparatus contemplated by this invention permits the separation of these liquid impurities in such a manner that the operator is not exposed to the injurious influence of the poisonous materials either by actual contact or by the inhalation of the vapors of the same.

Another object is to so construct an apparatus of this character capable of effecting a greater purity of the isolated substances than has heretofore been known.

Another object of the invention is to provide a simple and efficient apparatus for releasing the oil or other liquid from substances under treatment by a high pressure and removing the released liquid by suction.

Another object of the invention is to provide a rotary press for plastic and other substances so constructed that the liquid released from the material under treatment is drawn into the press and suitably evacuated.

With the foregoing and other objects in view, which will appear as the description proceeds, the invention resides in the combination and arrangement of parts and in the details of construction hereinafter described and claimed.

In the accompanying drawings:—

Figure 1:
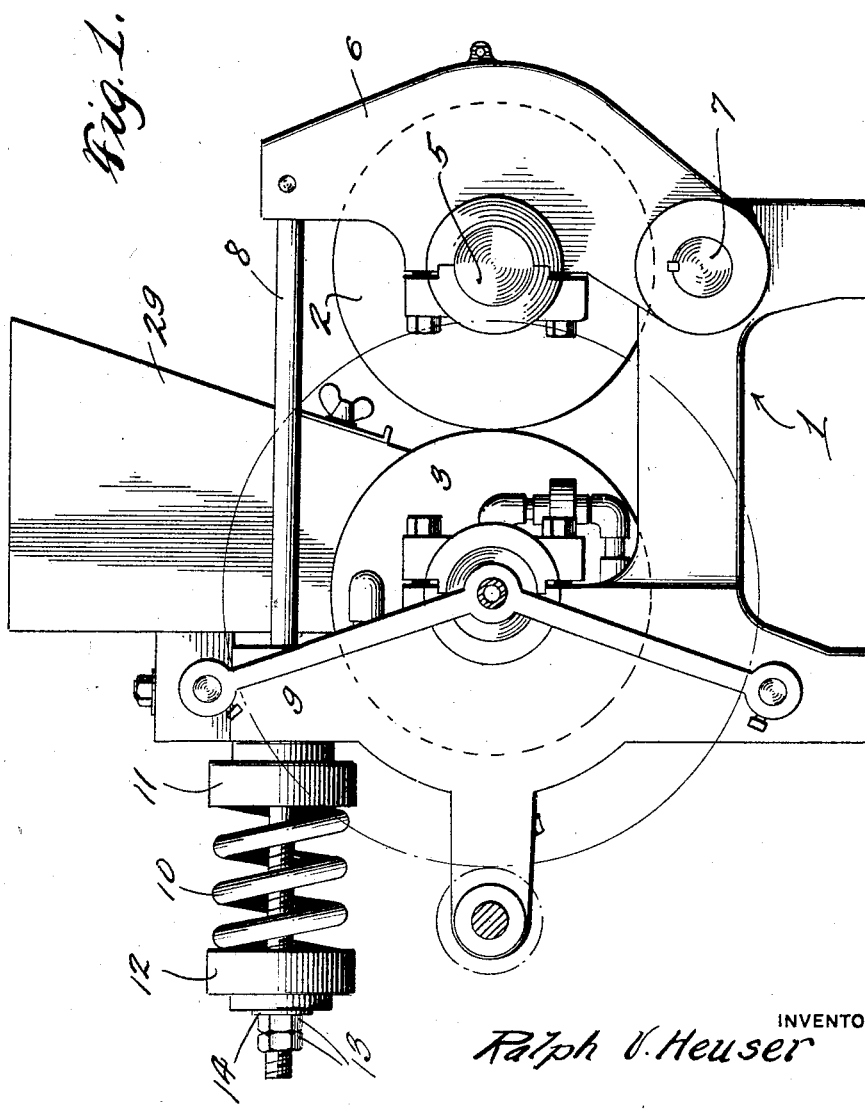
Figure 2:
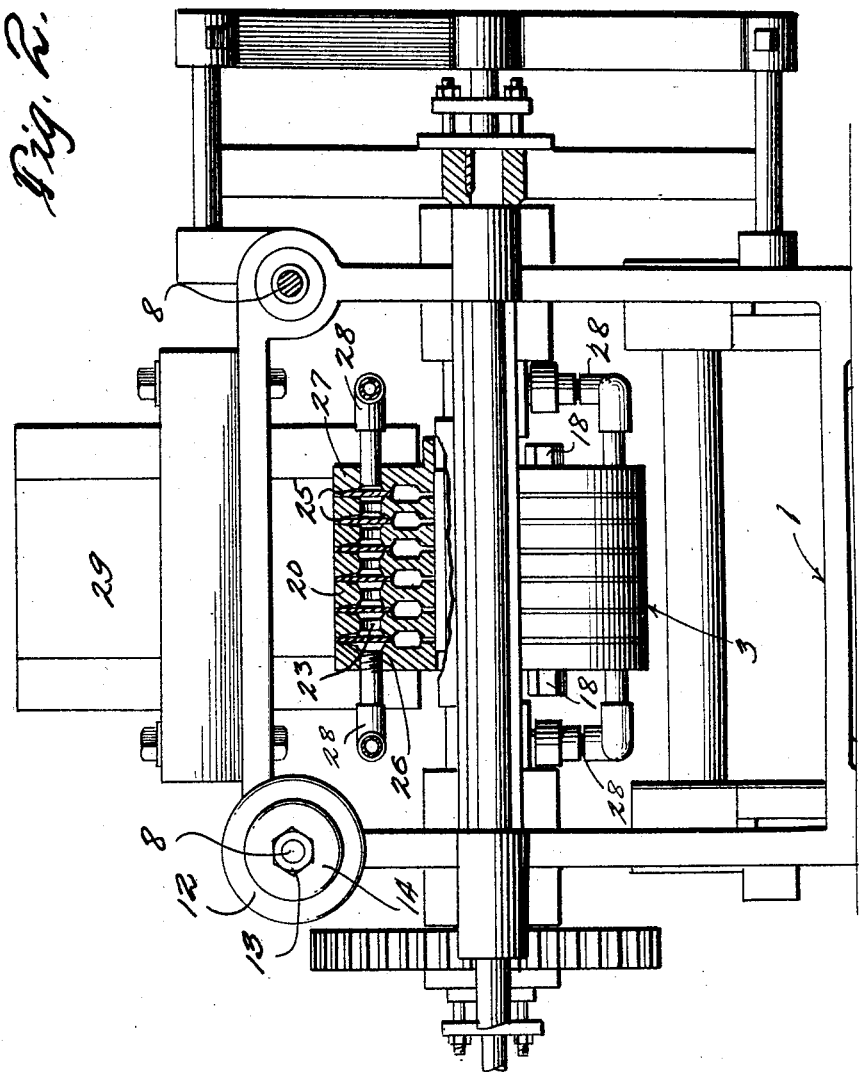
Figure 3:
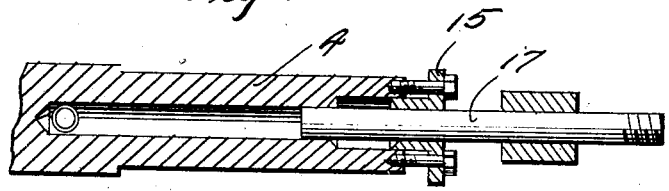
Figure 4:
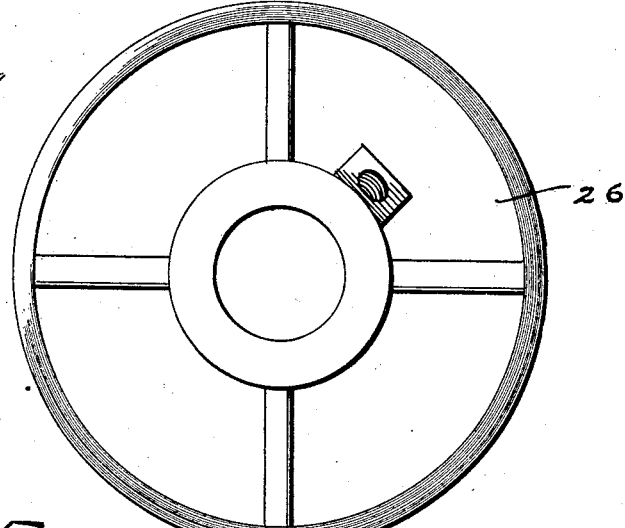
Figure 5:
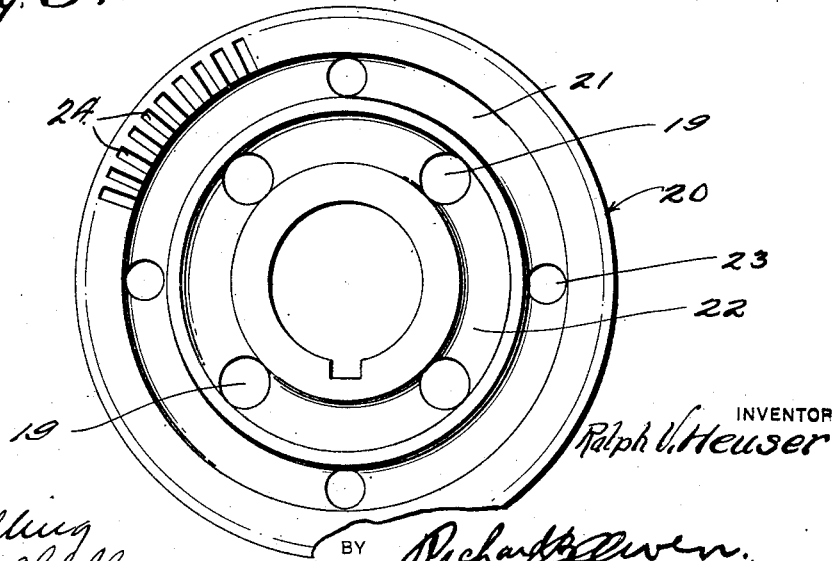

Figure 1 represents an end view of an apparatus constructed in accordance with this invention, Fig. 2 is a rear elevation with parts broken out and in section, Fig. 3 is a detail sectional view of a portion of a composite filter roll shaft, Fig. 4 is a side elevation of one of the end plates of the composite roll, and Fig. 5 is an inside view of one of the disks from which the composite roll is constructed, Fig. 6 is a diagrammatic view of the apparatus.

The centrifuge which is the apparatus commonly employed for this purpose has been found to be objectionable owing to the extremely poisonous character of some of the substances operated upon entailing great hardship to the workman when working on a large scale, since the fumes emitted as well as the discharging of the basket exposes him seriously to the danger of poisoning, and in spite of all vigilance and adherence to precautionary measures, the operator frequently contracts poisoning. Aside from this drawback, the operation of centrifuges when employed leaves much to be desired in certain instances where high degree of purification is aimed at.

By way of illustration, the centrifuge can advantageously be superseded by my apparatus in the manufacture of p-nitrochlorbenzol and 2,4-dinitrotoluol. These are examples of a large class of intermediates in which a definite, crystalline derivative is accompanied (even when prepared according to the best methods) by a comparatively large amount of liquid impurities.

Then there is another large class of intermediates and final products which are obtained entirely in a solid state but which are often not pure enough for the technical requirements. As example, of this type, I wish to mention the 2,4,6-trinitrotoluol and m-dinitrobenzol. In the case of the trinitrotoluol the author has found that an impure grade of same, such as may be recovered from the spent acid will not yield any oily impurities whatsoever on centrifuging the crude T.N.T. The same material when subjected in a suitable mold to high pressure delivered a very appreciable quantity of a somewhat dark colored oil leaving the remaining T.N.T. in a flaky, lightly colored condition and showing a melting point which was six degrees higher than before pressing.

If, however, the percentage of impurities is somewhat high very often the main reaction product is obtained in a greatly, minutely fine, indistinctly crystallized condition so that purification by means of washing it with solvents or of pressing it generally does not give any good results. In these cases I have found it very expedient to fuse the reaction product completely in a small quantity (say five to ten per cent. of the reaction product) of a suitable solvent for instance, benzol or solvent naphtha and allowing the mixture to cool without agitation. Generally the resulting cake shows a very good crystalline structure and the impurities are distributed in combination with the solvent in the interstices between the crystals. Centrifuging the broken-up cake very appreciably purifies the original product. Yet this centrifuging of material of which benzol or other inflammable solvents forms a component part is a decidedly dangerous operation, besides the operator of the centrifuge suffers by coming in contact with the material and its vapors and finally as we have seen in the above experiment with the T.N.T the result of the centrifuge is not all that may be desired of it in point of efficiency. In comparison with the intermittent performance of the centrifuge, my apparatus is continuous in action and the feeding and collecting of the materials can be done by mechanical means, and the separation is more nearly perfect. In special cases one of the rolls may be provided with an internal heating system so that the temperature can be adapted to the best conditions for a given separation.

To overcome the objections above set forth, the apparatus comprising this invention was designed and in the embodiment illustrated, a supporting frame 1 is shown having pressure rolls 2 and 3 mounted for revolution therein, the roll 2 being solid and mounted in a bracket 6 in suitable bearings, the shaft of said roll being shown at 5 in Fig. 1. This bracket 6 is pivotally mounted at 7 on the frame 1 and its free end has rods as 8 connected therewith, said rods extending transversely of the supporting frame or structure and slidably mounted in uprights 9. The projecting ends of these rods 8 have heavy coiled springs 10 mounted thereon between cups 11 and 12 with jam nuts 13 for securing the outer cup in operative position to prevent the tension of the spring from forcing said cup off the shaft. A washer 14 is shown arranged between the outer cup 12 and the jam nuts 13. (See Fig. 1.) These springs exert their pressure to move the bracket 6 inwardly toward roll 3 so that a heavy pressure is exerted by the periphery of the roll 2 on the periphery of the roll 3, the latter having its bearings fixedly mounted in the supporting frame 1.

The roll 3 which will be termed a filter roll is composed of a multiplicity of cast iron or steel disks 20 assembled on a hollow shaft 4, being keyed to said shaft. These metal disks 20 are provided on their opposed faces with annular grooves 21 and 22, the grooves 21 being arranged nearer the perimeter of the disk than the grooves 22. Apertures 23 extend through the disks 20 in the walls of the grooves 21 thereof to afford communication between the grooves of the various disks when assembled as is shown clearly in Fig. 2. Any desired number of these apertures may be employed, four being here shown. (See Fig. 5.) The flat faces of the disks 20 outside the grooves 21 thereof are provided with a plurality of radially extending grooves 24 which increase in depth from their outer edges toward grooves 21 for a purpose presently to be described. Arranged between the disks 20 are a plurality of annular members 25 composed of porous material of any suitable character such as filter cloth, asbestos sheeting, fine woven wire, etc. These porous members 25 which are interposed between the successive disks 20 operate to absorb the liquid released by compression of the material between the rolls 2 and 3 and said liquid will be sucked in from the surface of the rolls through the porous diaphragms 25 into the annular grooves or recesses 21 in the interior of the composite roll 3. By forming the apertures 23 in the disks the annular grooves of the various disks are interconnected so that communication between the grooves and the end plates 26 and 27 is effected. Leading from these end plates and communicating with the hollow shaft 4 are pipes 28 which form conduits for conducting the liquid from the interior of the composite roll to the hollow shaft 4 which is suitably connected with a suction pump 31, so that when the machine is in operation, the suction through the hollow shaft will operate to draw the liquid into the roll through the diaphragms 25 and pass it out to a suitable receiver 32.

The hollow shaft 4 of the composite roll has two stuffing boxes such as the one indicated at 15 in Fig. 3 to provide for the connection on one side with the suction chamber or receiver 32 for the liquid material drawn in through the diaphragms 25 to the interior of the roll 3, and on the other side of the shaft connection is made with a chamber 33, adapted to contain a suitable solvent, such as benzol, gasolene, or the like, which is attracted by the suction applied on the other side of the shaft through the grooves to prevent clogging of the interior channels when oils of a high viscosity are extracted. By means of a valve 34, interposed in the pipe 35 between the hollow shaft and the solvent container, the flow can be regulated. However, for ordinary purposes, no solvent will be required, and the connection with the chamber may be closed by the valve 34 when not required.

The receiver or vacuum chamber 32 is equipped with an air release valve 36 and a sight tube 37. This receiver is connected with a pump 31 by a pipe 38 which has a valve 39 therein for cutting off connection between the pump 31 and the receiver 32 when desired. A storage chamber 40 is preferably connected with chamber 32 by a pipe 41 having a valve 42 therein.

The thickness of the disks 20 between their peripheries and the annular grooves 21 is slightly less than the thickness of the said disks on the inside which is designed to insure distribution of the greatest pressure near the central portion of the disks so that the diaphragms 25 in this zone will form a gasket and prevent the leaking in of air from the inside of the roll toward the annular grooves 21. Moreover, the reduction of the thickness of the disks near the periphery of the roll will cause the diaphragms at this point to be only slightly compressed so that there will be no interference with the passage of the liquid from the periphery of the roll to the annular grooves therein. The space between the successive disks at the peripheries thereof should be sufficient only to accommodate the diaphragms, otherwise there would be liability of solid material being pressed inward to the interior of the roll. Ordinarily in the separation of decidedly crystalline bodies from the liquid impurities, such as those mentioned above, the material will be squeezed on the face between the solid roll 2 and the face of the disks of the composite roll and the distance between two disks must be so small that there is no chance of crystals being pressed into the interstices.

The formation of the radial grooves 24 in the faces of the disks facilitates the passage of the liquid from the periphery of the roll to the annular grooves in the disks thereof and also serve to firmly hold the diaphragms in position.

A hopper 29 is arranged over the roll 3 and is designed to receive the material to be treated by the rolls, said material being fed from the hopper by gravity to the composite roll 3 and the rolls being rotated toward each other by suitably driven means a powerful pressure is exerted upon the material. If no suction were used the material would be discharged in the same condition as it entered on top, since the liquid pressed out would be reabsorbed by the solid material passing through, hence, the construction of the composite roll 3 herein employed, which is connected through the hollow shaft with a suitable suction apparatus not shown. This apparatus operates to suck the liquid from the diaphragms into the annular grooves and from there, through pipes 28 to the hollow shaft 4 to the receiver. It is to be understood that the release of the oil from the crystalline body or other material under treatment takes place only in the zone where the capillarity of the crystalline body is reduced to a minimum and that is at the point where the rolls approach each other closest.

The removal of the oil through the porous diaphragms is accomplished in a manner similar to an ordinary filtration under suction, in which a higher efficiency is obtained by diminishing the capillarity of the solid material left on the filter through compression.

From the above description it will thus be seen that by the use of this apparatus a practically complete separation of liquid from the solid crystalline bodies treated is effected without subjecting the workmen to any danger from poison fumes. This apparatus not only protects the workmen but it accomplishes results not obtainable by a centrifuge, as pointed out at the beginning of this specification.

The disks 20 and end plates 26 and 27 are held in assembled relation by a plurality of bolts as 18 which pass through apertures 19 in the inner grooves 22 of the disks. These bolts 18 are evenly distributed about the axis of the roll 3 and are designed to hold the disks tightly in operative position. One of the rolls may be provided on its interior with a heating medium so that the temperature may be adapted to the best conditions for a given separation.

The foregoing description and the drawings have reference to what may be considered the preferred or approved form of my invention.

The rolls 2 and 3 may be rotated by any suitable means, the shaft thereof being preferably geared together by cogwheels, thereby insuring the rotation of the rolls against each other in a constrained manner.

Having thus fully described my invention, what I claim as new and desire to secure by Letters Patent, is:—

1. In an apparatus of the class described, a pair of high pressure rolls, one of which is composed of disks having porous material between them and extending to the periphery of the roll, a chamber within the roll into which said porous material extends, and means connected with said chamber for drawing off the liquid released from the material treated by the rolls.

2. In a filter press, a member composed of a plurality of solid and porous elements arranged for contact with the material to be treated, said press having a chamber into which said porous elements extend, and suction producing means connected with said chamber for drawing into the press the liquid released from the material treated by said press.

3. In an apparatus of the class described, a pair of pressure rolls operable to turn toward each other and equipped with means for exerting high pressure at the periphery thereof, one of said rolls being solid and the other composed of a multiplicity of solid disks with annular grooves formed on the opposed faces of said disks with apertures extending through the walls thereof to afford communication between the grooves of the various disks, porous elements arranged between said disks, and pipes connected with said grooves and adapted to be connected with suction means whereby the liquid released by the pressure of the rolls on the material treated is drawn into said grooves and conveyed to a suitable place of deposit.

4. An apparatus of the class described including a composite filter roll composed of a hollow shaft, a plurality of metal disks keyed thereto with annular grooves in their opposed faces and radial grooves extending from said annular grooves to a point near the peripheries of the disks, end plates between which said disks are mounted having apertures therein, capillary annular diaphragms arranged between said disks and extending to the peripheries thereof and across the grooves therein, and pipes connecting the apertures in said end plates with said hollow shaft.

In testimony whereof I affix my signature in presence of two witnesses.

RALPH V. HEUSER.

Witnesses:
J. WALTER WEBB,
W. M. WRIGHT.